United States Patent
Li et al.

(10) Patent No.: US 7,822,965 B2
(45) Date of Patent: Oct. 26, 2010

(54) BIOS FILE SWITCHING METHOD AND CONTROLLER DEVICE THEREOF

(75) Inventors: Xin-Xi Li, Taipei County (TW); Shang-Zhi Wu, Taipei County (TW); Xin-Ping Huang, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 574 days.

(21) Appl. No.: 11/871,216

(22) Filed: Oct. 12, 2007

(65) Prior Publication Data

US 2008/0195853 A1 Aug. 14, 2008

(30) Foreign Application Priority Data

Feb. 14, 2007 (CN) .................. 2007 1 0080166

(51) Int. Cl.
  *G06F 9/00* (2006.01)
  *G06F 12/00* (2006.01)
  *G06F 11/00* (2006.01)
  *G11C 29/00* (2006.01)
  *G08C 25/00* (2006.01)

(52) U.S. Cl. ............... 713/2; 713/1; 711/170; 711/220; 714/36; 714/48; 714/765; 714/799

(58) Field of Classification Search ............ 713/1, 713/2; 714/36, 48, 765, 799, 38; 711/170, 711/220

See application file for complete search history.

(56) References Cited

U.S. PATENT DOCUMENTS

| | | | |
|---|---|---|---|
| 4,888,691 A | 12/1989 | George et al. | |
| 6,421,792 B1 * | 7/2002 | Cromer et al. | ............ 714/36 |
| 6,584,559 B1 * | 6/2003 | Huh et al. | .............. 713/2 |
| 6,651,188 B2 * | 11/2003 | Harding et al. | ......... 714/38 |
| 2002/0099974 A1 | 7/2002 | Lin | |
| 2004/0158702 A1 | 8/2004 | Tasaki | |
| 2007/0174704 A1 * | 7/2007 | Shih | ............... 714/36 |

OTHER PUBLICATIONS

EP Search Report mailed May 30, 2008.

* cited by examiner

*Primary Examiner*—Stefan Stoynov
(74) *Attorney, Agent, or Firm*—Thomas, Kayden, Horstemeyer & Risley

(57) ABSTRACT

A file switching method of a Basic Input/Output System (BIOS) file is disclosed. Upon a received read instruction, a timer for a predetermined timing is initiated, and a first data page having a requested data is read from a first BIOS file. An error correction check on the first data page is performed to check if any error in the first data page. If an error is occurred in the error correction check, repeating the step "reading the first data page". If number of times of the repeating step exceeds a predetermined number, or if the predetermined timing is expired, a second data page having the requested data is read from a second BIOS file according to the read instruction.

9 Claims, 5 Drawing Sheets

BIOS FILE SWITCHING METHOD AND CONTROLLER DEVICE THEREOF

BACKGROUND OF THE INVENTION

1. Field of the Invention

The invention relates to Basic Input Output System (BIOS) in computer systems, and in particular, to an automatic switching method of multiple BIOS system files in a computer system and device thereof.

2. Description of the Related Art

A BIOS (Basic Input Output System) or a ROM-BIOS (read-only memory basic input output system), is a firmware permanently programmed in a computer for a computer system initialization and operation. The BIOS could provide the lowest level and most direct hardware control for the computer. Specifically, basic input output system serves to provide system testing and initialization upon computer booting.

In the startup process of a computer system, Power On Self Test (POST) is initially performed to check if all components are present and functioning properly. After that, system initialization is performed, including reconstructing of broken vectors, setting registers, and performing initialization and tests on external devices. An important part of the startup process is the BIOS file, comprising primarily parameters for hardware devices. During a computer power-up, the parameters in the BIOS file are read out and compared with actual hardware devices. If the parameters in the BIOS file match with the actual hardware devices, the computer starts booting process of an operation system. Otherwise, the startup process of the computer system is stopped.

FIG. 1 is a block diagram of a computer system including BIOS file 18. As shown in FIG. 1, BIOS file 18 is stored in a stand-alone Electrically Erasable Programmable Read-Only Memory (EEPROM) chip 16. Typically, EEPROM chip 16 is welded on a main board and coupled to a south bridge chip 14. In a normal condition, BIOS file 18 stored in EEPROM chip 16 comprises parameters matching with the hardware devices of the computer. However, in some exceptional conditions, e.g., when the computer system is attacked by a Chernobyl (CIH) virus, the BIOS file 18 will be modified by the CIH virus, so the computer system can not initialized properly due to mismatch between the parameters and the computer hardware devices. For solving above-mentioned problem, numbers of security mechanisms for BIOS file are provided, such as write protection, CIH virus protection, to prevent BIOS file 18 from illegally modified, or allow the computer to power up normally with a backup BIOS file in the case of illegal modification.

However, if the storage media storing the BIOS file or the signal interconnection is not working, for example, EEPROM chip 16 is damaged, or the interconnecting wires between the EEPROM chip 16 and south bridge chip 14 are not working, during the startup process, the computer continually tries to read BIOS file 18 without carrying on the startup process, or issuing an error signal. Under this condition, despite the presence of a backup BIOS file in the computer system, the computer cannot switch automatically to the backup BIOS file to read information and will remain disabled.

Thus it is crucial for a computer system with multiple BIOS files to be able to switch automatically to another BIOS file, when the storage media storing the present BIOS files is damaged.

BRIEF SUMMARY OF THE INVENTION

A detailed description is given in the following embodiments with reference to the accompanying drawings.

According to an embodiment of the invention, a file switching method of a Basic Input/Output System (BIOS) file is disclosed. Upon a received read instruction, a timer for a predetermined timing is initiated, and a first data page having a requested data is read from a first BIOS file. An error correction check on the first data page is performed to check if any error in the first data page. If an error is occurred in the error correction check, repeating the step "reading the first data page". If number of times of the repeating step exceeds a predetermined number, or if the predetermined timing is expired, a second data page having the requested data is read from a second BIOS file according to the read instruction.

According to another embodiment of the invention, a controller capable of supporting switching of BIOS files is provided. The controller comprises a timer, an error correction check module, a counter, a trigger module, and an address computation module. The timer times a predetermined timing and generates a time signal according to receiving of a read instruction. The error correction check module performs error correction check on a data page from a first BIOS file. The counter is coupled to the error correction check module, generates a count signal according to the number of times the data page is re-read if an error is occurred in the error correction check. The trigger module receives the time signal from the timer and the count signal from the counter, and generates a switching signal if the predetermined timing is time out or if the count signal exceeds a maximal re-reading count. The address computation module generates a read address according to a byte relative address and the switching signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
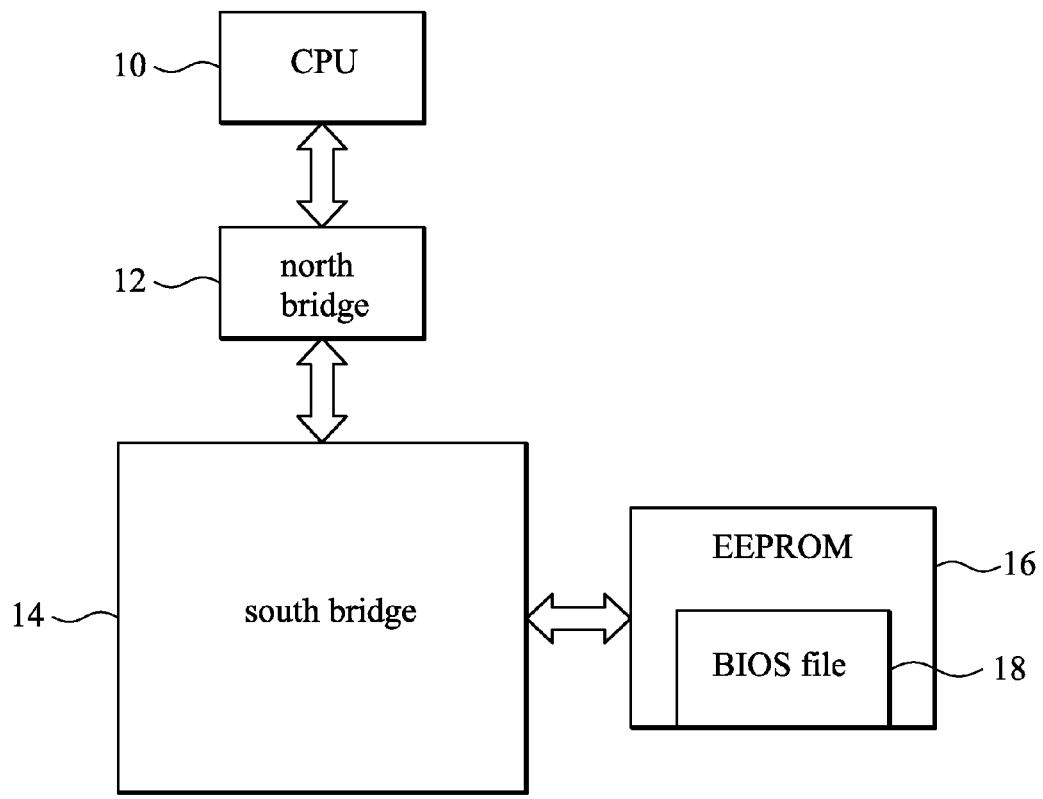
FIG. 1 is a block diagram of a computer system including Basic Input/Output System file 18.
Figure 2:
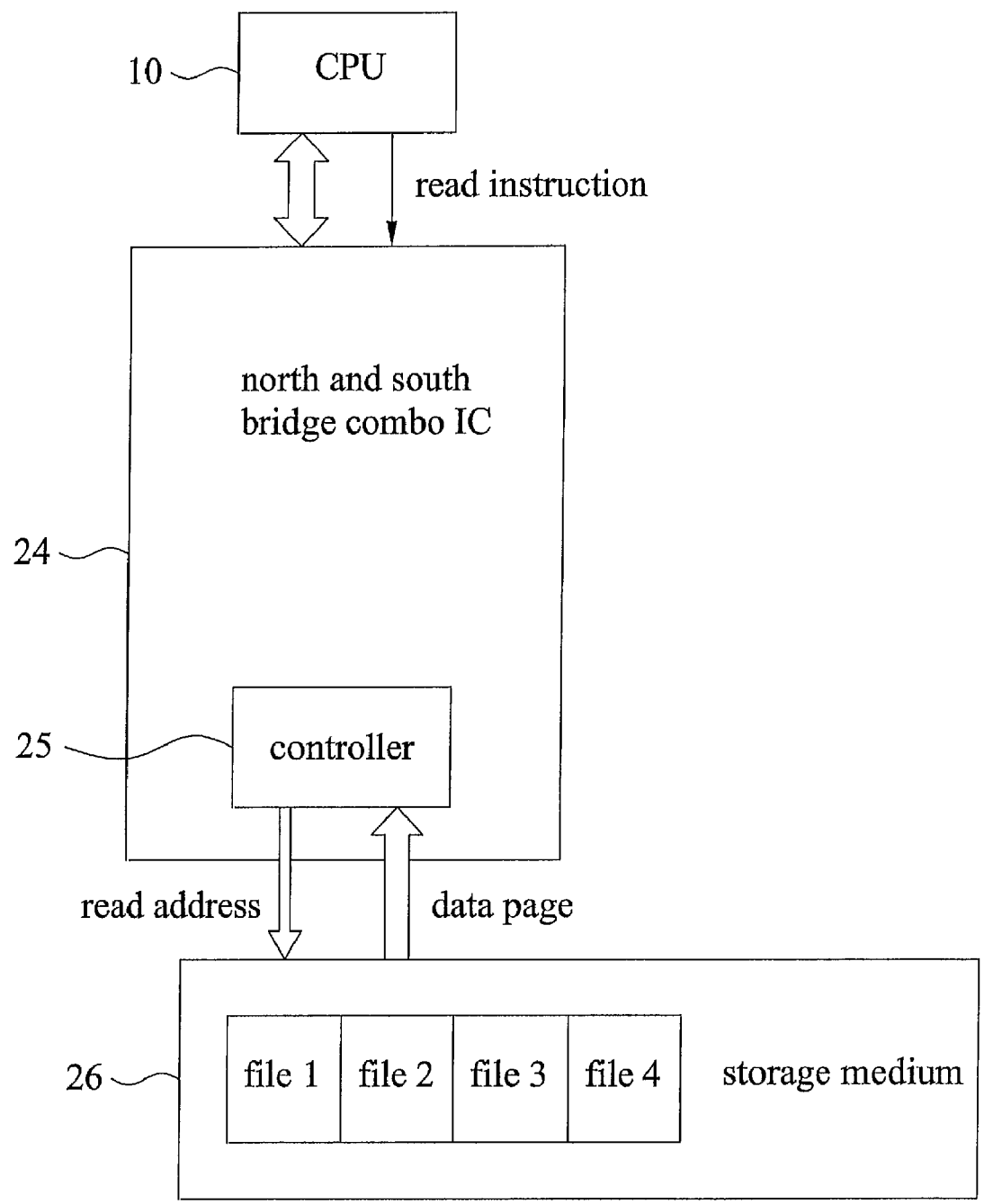
FIG. 2 is a block diagram for an exemplary Basic Input/Output System controller 25 in a computer system.

FIG. 2 is a block diagram for an exemplary BIOS (Basic Input/Output System) controller 25 in a computer system. As shown in FIG. 2, the BIOS controller 25 is located on north and south bridge combo IC 24, controlling the automatic switching process between BIOS files BIOS1~BIOS4 in storage medium 26. During a power up process of the computer system, Central Processing Unit (CPU) 10 issues a read instruction to the BIOS controller 25 through north and south bridge combo IC 24. Upon receiving of the read instruction, the BIOS controller 25 initiates an internal timer, and outputs a read address to the storage medium 26 according to the read instruction. The storage medium 26 then returns a data page of the present BIOS file, e.g., BIOS1, according to the read address. The BIOS controller 25 performs Error Correction Check (ECC) on the data page. The BIOS controller 25 repeats the data page reading process and ECC process, if the ECC result indicates that the data page has missing or erroneous bits. If the data page is read by more than a predetermined number of times or the timer exceeds a predetermined timing, the BIOS controller 25 switches to another BIOS file, e.g., BIOS2, to read the data page having requested data.

It should be noted that the BIOS controller 25 may located on a south bridge chip, BIOS files BIOS1 to BIOS4 may be stored on an identical storage medium, or different mediums. Storage medium 26 may be an NAND flash memory, or other non-volatile storage mediums.

To further understand the mechanism that the BIOS controller 25 uses to control file switching between BIOS1 to BIOS4 files, an internal structure of the BIOS file BIOS1 in storage medium 26 is illustrated as an example. Please refer to FIG. 3, a block diagram of BIOS file BIOS1 in storage medium 26. The BIOS file BIOS1 is divided by n data blocks (block 1~block n), and each data block may be divided to m data page (page 1~page m). Taking a 2 Mb BIOS file as an example, assuming 128 kb for each data block and 2 kb for each data page, the 2 Mb BIOS would comprise 16 data blocks and each block would comprise 64 data pages. Each data page would have a predetermined data format. Taking page 2 of data block 4 in FIG. 3 as an example, page 2 is constituted of a Data part and a corresponding ECC code part. When reading data page 2, ECC code part is used for performing error check and correction to Data part, ensuring validity of Data part.

Figure 3:
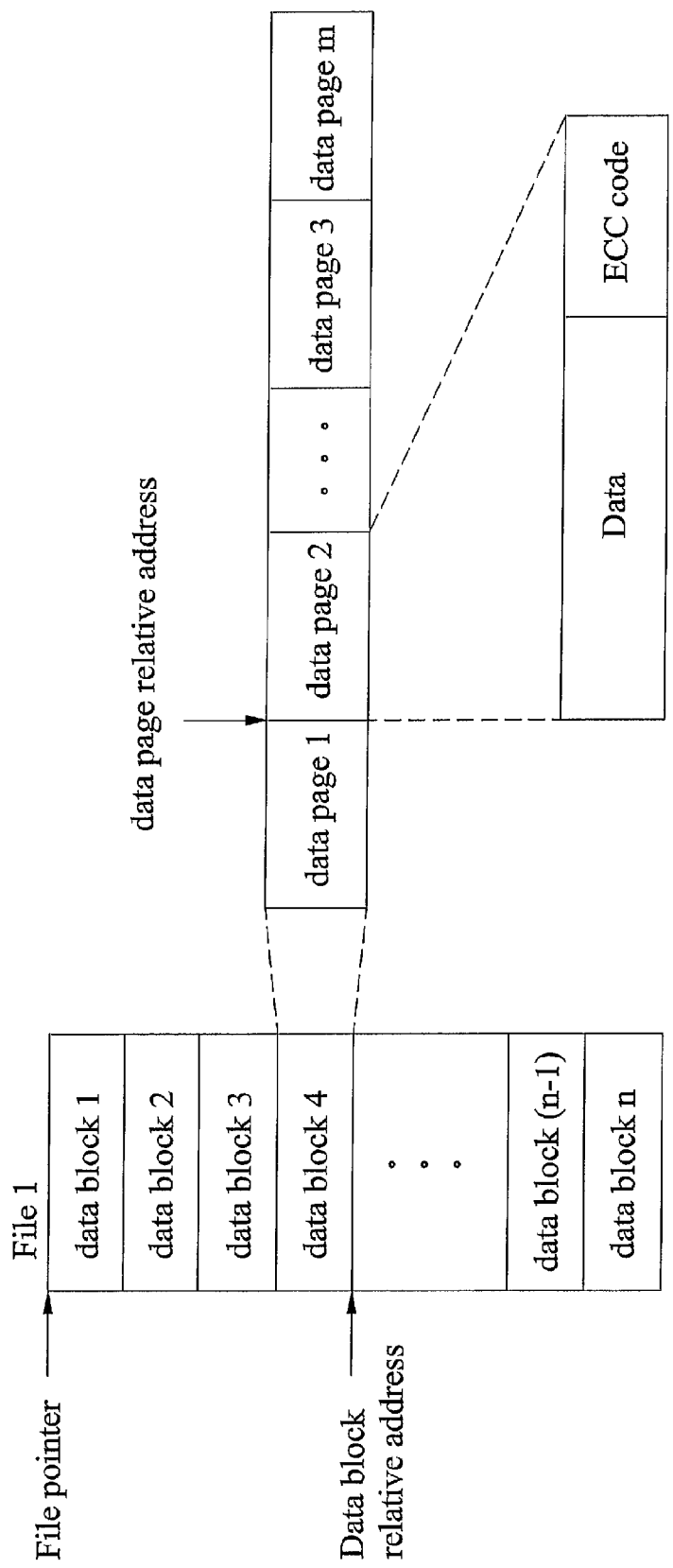
FIG. 3 is a block diagram of Basic Input/Output System file 1 in storage medium 26.

Further, the BIOS controller 25 in FIG. 2 outputs a read address to the storage medium 26, comprising a start address of a BIOS file, a data block relative address, and a data page relative address. As shown in FIG. 3, a file pointer points to the start address of the BIOS file. The data block relative address represents the offset of a start address of a specified data block from the start address of the BIOS file. The data page relative address represents the offset of a start address of a specified data page from the start address of the data block. When the BIOS controller 25 wants to read a specific data page from the storage medium 26, the BIOS controller 25 calculates the data block relative address of the data block and the data page relative address according to a byte relative address in the received read instruction. According to the start address of the BIOS file, the data block relative address, and the data page relative address, the storage medium 26 can find the data page in the BIOS file accurately and returns the data page to BIOS controller 25.

Figure 4:
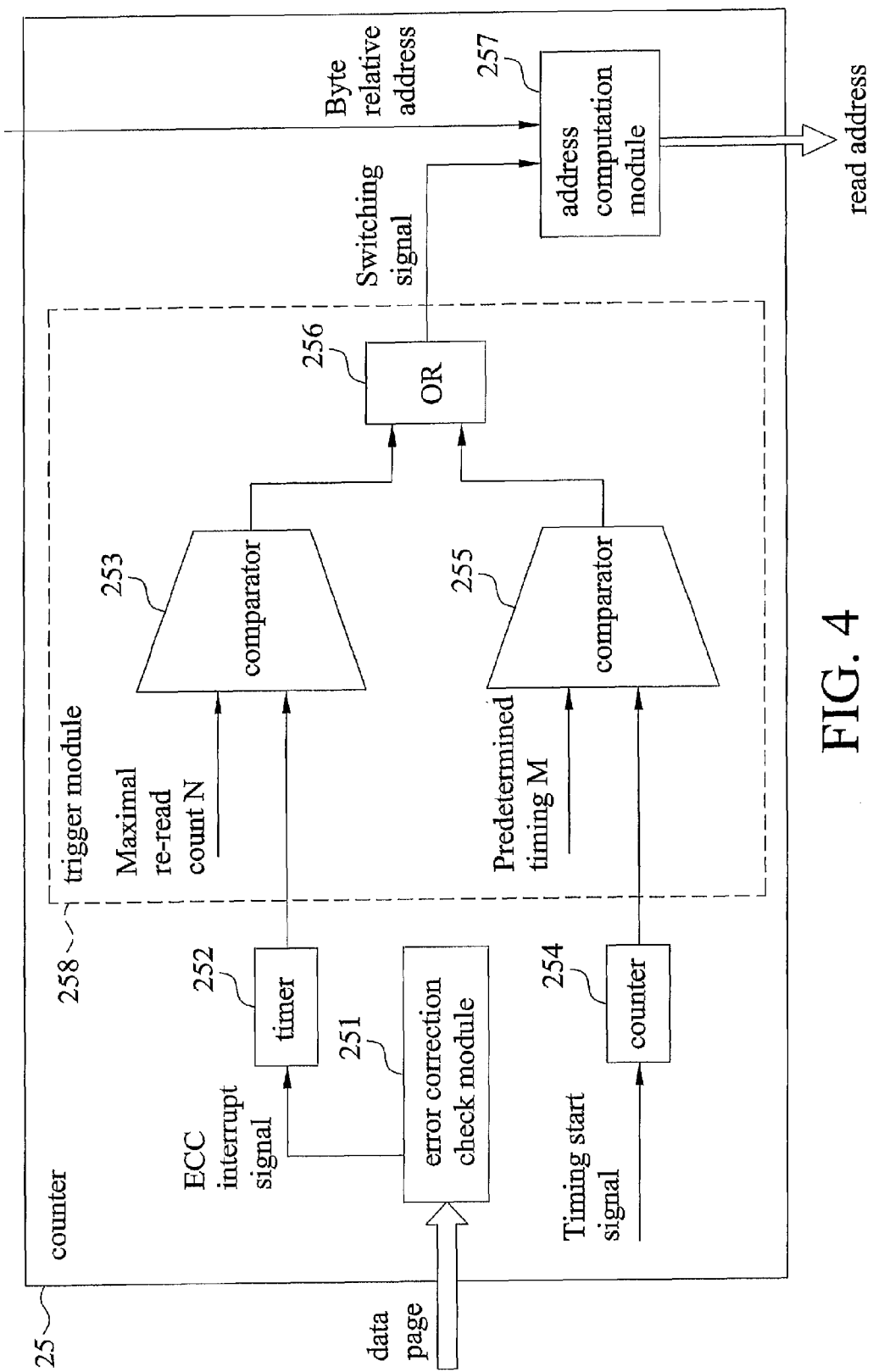
FIG. 4 is a circuit schematic of Basic Input/Output System controller 25 in FIG. 2.

FIG. 4 is a circuit schematic of the BIOS controller 25 in FIG. 2. As shown in FIG. 4, the BIOS controller 25 comprises error correction check module 251 performing error check and correction on the read data page and counter 252 coupled thereto. The error correction check module 251 issues an ECC interrupt signal when the error check and correction signifies an error in the data page. The BIOS controller 25 will re-read the data page from storage medium 26 according to the ECC interrupt signal. The counter 252 is initialized at 0, generates a count signal indicating the number of times the data page is re-read upon receiving the ECC interrupt signal issued by error correction check module 251.

The BIOS controller 25 also comprises timer 254. The BIOS controller 25 releases a timing start signal to timer 254 upon receiving the read instruction issued by the CPU 10. The timer 254 is started according to the timing start signal from the BIOS controller 25, and outputs a time signal. The BIOS controller 25 further comprises trigger module 258 receiving the count signal issued by the counter 252 and the time signal issued by the timer 254. If the time signal from timer 254 exceeds a predetermined timing, or the count signal from counter 252 exceeds a maximal re-read count, the trigger module 258 generates a switch signal to perform BIOS file switching.

Specifically, the trigger module 258 comprises comparator 253, comparator 255, and OR gate 256. The timer 254 outputs the time signal as an input to comparator 255, another input terminal of comparator 255 receives predetermined timing M. The predetermined timing M is configured during system initialization. The comparator 255 performs comparison on the time signal and the predetermined timing M whenever the time signal from timer 254 changes, to determine whether the time signal reaches the predetermined timing M. Once the time signal of timer 254 reaches the predetermined timing M, the comparator 255 outputs a "HIGH" level signal to indicate a need for switching BIOS files. Similarly, counter 252 outputs the count signal as an input of comparator 253 in trigger module 258, another input terminal of comparator 253 receives maximal re-read count N. the maximal re-read count N is configured during system initialization. The comparator 253 performs comparison on the count signal and maximal re-read count N whenever the count signal from the counter 252 changes, to determine whether the count signal reaches the maximal re-read count N. Once the count signal of counter 252 reaches the maximal re-read count N, the comparator 253 outputs a "HIGH" level signal to indicate a need for switching BIOS files. OR gate 256 receives the output signals from the comparator 253 and the comparator 255 to generate the switching signal.

The BIOS controller 25 in the embodiment further comprises address computation module 257. The Address computation module 257 is coupled to the OR gate 256 in trigger module 258 for adjusting the file pointer to a start address of another BIOS file upon receiving the switching signal.

It is noted that the read instruction issued by the CPU 10 is typically a request to read a portion of specific data in the BIOS file. Thus, the read instruction comprises the byte relative address to instruct the BIOS controller 25 to read the data at the relative address in the BIOS file. However, according to the internal structure of the BIOS file in FIG. 3, the minimal unit for performing ECC check on the read data is a data page, that is, no ECC check can be performed on a single data in the BIOS file. Thus, the address computation module 257 in the embodiment not only adjusts the file pointer according to the switching signal, but also calculates the data block relative address of the corresponding data block according to the byte relative address. The BIOS controller 25 sends the start address of the BIOS file, the data block relative address and the data page relative address as the read address to the storage medium 26. The storage medium 26 returns the data page comprising the data requested by the read instruction according to the read address. Next, error correction check module 251 performs ECC check on the data page to verify the validity of the data. If no error is occurred during the ECC check process, the data page can be outputted. The BIOS controller 25 then searches the corresponding data from the data page based on the byte relative address of the BIOS file and returns the requested data to the CPU 10.

Regardless of storing multiple BIOS files in an identical storage medium (FIG. 2) or in different storage media, the embodiment in the invention permits the system to re-read the BIOS file for a predetermined number of times. If all re-reading attempts fail, the system switches to another BIOS file to read the data page comprising the requested data. Similarly, if the storage media or the signal connection is broken completely to result in the impossibility of reading the BIOS file, the BIOS controller according to the invention can switch to the BIOS file on another storage media, or provide the information of BIOS file corruption to prevent the computer system from idling without any response.

Figure 5:
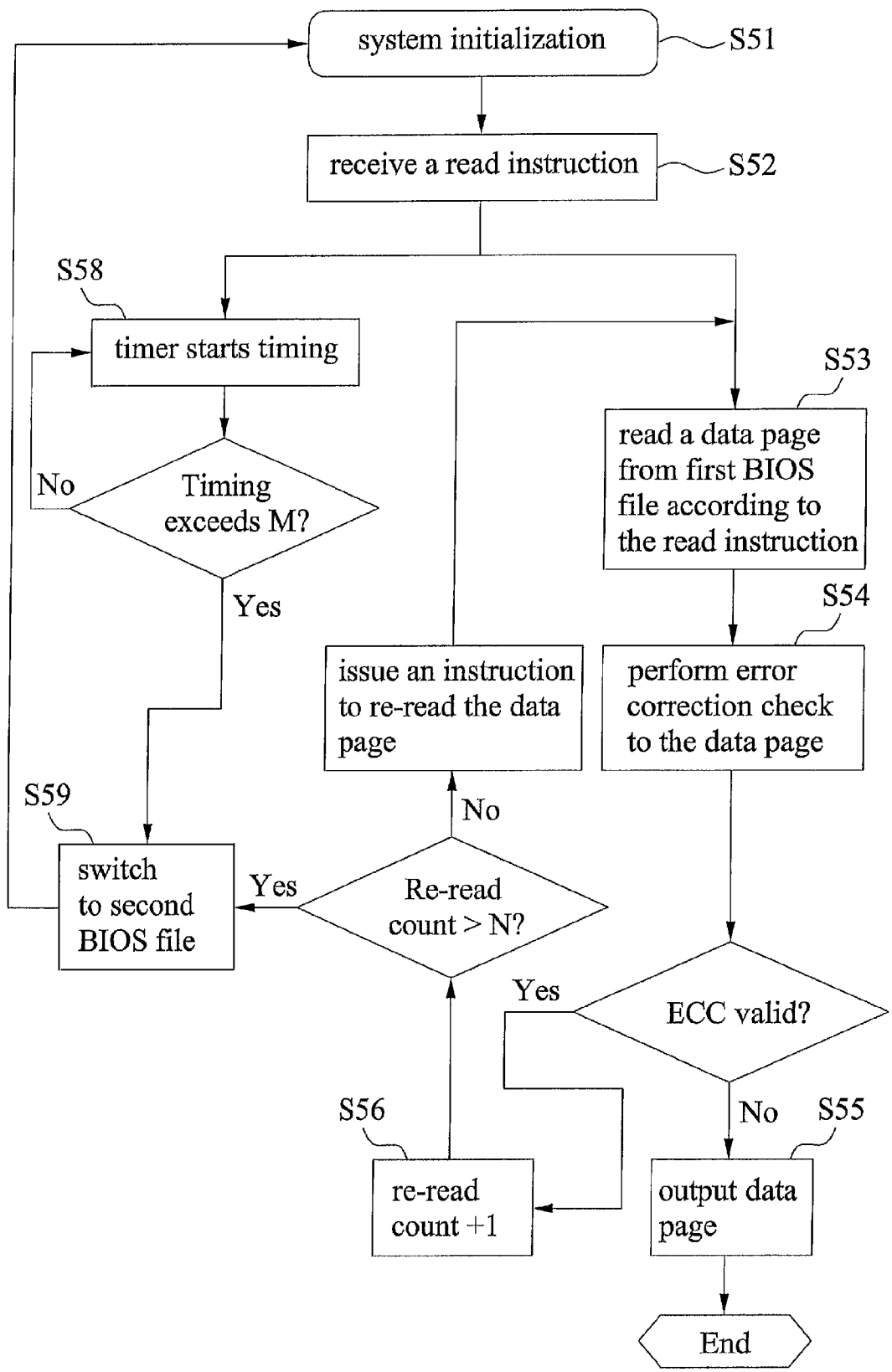
FIG. 5 is a flowchart of an exemplary Basic Input/Output System file automatic switching method according to the invention.

FIG. 5 is a flowchart of an exemplary BIOS file automatic switching method according to the invention.

Firstly, in Step S51 the system is initialized, for example, setting the predetermined timing M of the timer 254 and maximal re-read count N of the counter 252. Next in Step S52, the BIOS controller 25 receives a read instruction issued by the CPU 10. In Step S53, the BIOS controller 25 reads a data page from first BIOS file according to the read instruction. In detail, the BIOS controller 25 calculates corresponding data block relative address and data page relative address according to a byte relative address of the BIOS file in the read instruction, and reads the corresponding data page from the BIOS file according to a file pointer, the data block relative address and the data page relative address. In Step S54, the BIOS controller 25 performs ECC check on the read data page to determine the validity of the data. If no error has occurred in the ECC check, the BIOS controller 25 outputs the data page, and returns the corresponding data from the data page according to the byte relative address of the BIOS file to the CPU 10 (Step S55). If error has occurred in the ECC check, in Step S56, the counter 252 increments the count value by 1 to indicate re-read times of the data page. If the re-read count does not exceed the maximal re-read count N, the BIOS controller 25 re-issues an instruction to re-read the data page in Step S57. Conversely, if the re-read count exceeds a maximal re-read count N, then the BIOS controller 25 conducts BIOS file switching, i.e. the BIOS controller 25 adjusts the file pointer to a start address of a second BIOS file (Step S59). Next, the process returns back to Step S51 to proceed with system initialization, repeat sequential steps to perform read operation from the second BIOS file.

In addition, when receiving the read instruction, the timer 254 in BIOS controller 25 starts timing in Step S58. If the timing value of the timer 254 exceeds the predetermined timing M, i.e. the operating time exceeds the predetermined timing M, the process then enters Step S59. In Step S59, the BIOS controller 25 adjusts the file pointer to the start address of the second BIOS file. The timing procedure of timer 254 (Step S58) and the reading data page steps (Steps S53~S57) are concurrent. Further, if the data page having required data is read out successfully by Steps S53~S55, the timer 254 will be reset to 0. According to the multiple BIOS files automatic switching method disclosed in the invention, in the initialization process of a computer system, if the storage media of the read BIOS file or the signal connection is broken, the computer system can switch to a functional BIOS file automatically to prevent the computer system from idling with no response. In the embodiments, when the controller receives a read instruction, it detects operating time and data page re-read times to prevent system idling. People skilled in the art can recognize that the time value of timer 254 and the count value of counter 252 should be set to 0 in a reset step, which could be prior to Step S52 or next to Step S55 and Step S59.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A file switching method of Basic Input/Output System (BIOS) files, comprising:

receiving a read instruction, wherein the read instruction comprises a byte relative address, a data block relative address and a data page relative address are calculated according to the byte relative address;

initiating a timer for a predetermined timing according to the read instruction;

reading a first data page having a requested data from a first BIOS file according to the read instruction;

performing an error correction check on the first data page;

repeating the step of reading the first data page if an error is occurred in the error correction check and counting a number of times of the repeating step;

switching to a second BIOS file, if the number of times of the repeating step exceeds a predetermined number, or if the predetermined timing is expired; and reading a second data page having the requested data from the second BIOS file according to the read instruction.

2. The file switching method of claim 1, comprising:

searching the first BIOS file according to a file pointer pointing to a start address of the first BIOS file; and adjusting the file pointer to a start address of the second BIOS file, if the number of times of the repeating step exceeds a predetermined number, or if the predetermined timing is expired.

3. The file switching method of claim 1, characterized in that the first data page is read out from a storage media according to a file pointer, the data block relative address and the data page relative address.

4. The file switching method of claim 1 comprising: outputting the first data page if no error is occurred in the error correction check.

5. A controller supporting switching of BIOS files, comprising:

a timer, initiating timing for a predetermined timing and generating a time signal according to receiving of a read instruction;

an error correction check module, performing error correction check on a data page from a first BIOS file;

a counter, coupled to the error correction check module, generating a count signal according to the number of times the data page is re-read if an error is occurred in the error correction check;

a trigger module, receiving the time signal from the timer and the count signal from the counter, and generating a switching signal if the predetermined timing is time out or if the count signal exceeds a maximal re-reading count; and an address computation module, generating a read address according to a byte relative address and the switching signal, wherein the address computation module computes corresponding data block relative address and data page relative address according to the byte relative address.

6. The controller of claim 5, characterized in that the trigger module comprises a comparator, coupled to the timer, comparing the time signal and the predetermined timing to determine whether the time signal exceeds the predetermined timing.

7. The controller of claim 5, characterized in that the trigger module comprises a comparator, coupled to the counter, comparing the count signal and the maximal re-reading count to determine whether the count signal exceeds the maximal re-reading count.

8. The controller of claim 5, characterized in that the trigger module comprises an OR gate, having an input terminal receiving comparison output of the time signal of the timer and the predetermined timing, and another input terminal receiving comparison output of the count signal of the counter and the maximal re-reading count, and outputting the switching signal.

9. The controller of claim 5, characterized in that the address computation module receives the switching signal, and adjusts a file pointer to a start address of a second BIOS file according to the switching signal.

* * * * *